INVENTORS
Arnold R. Buchholz
Frank Haban

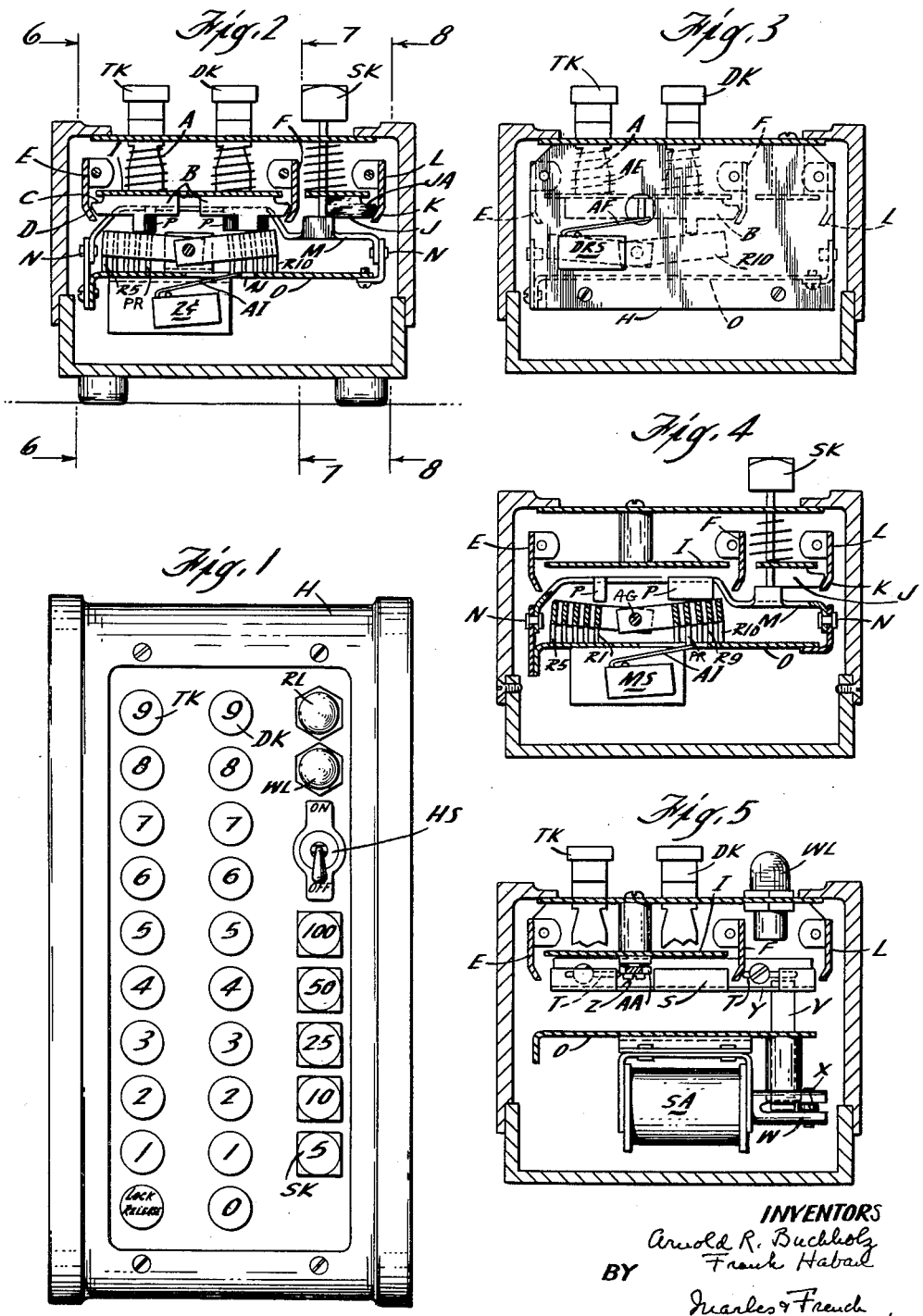

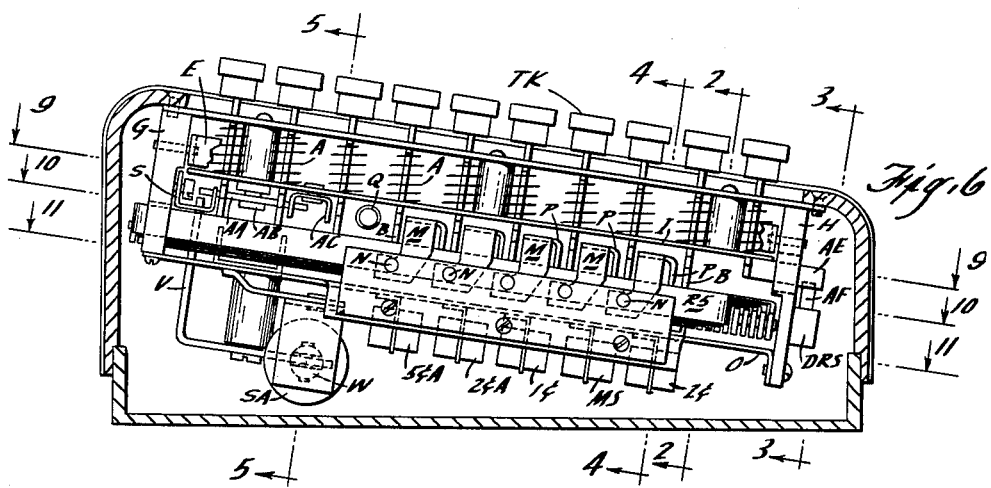
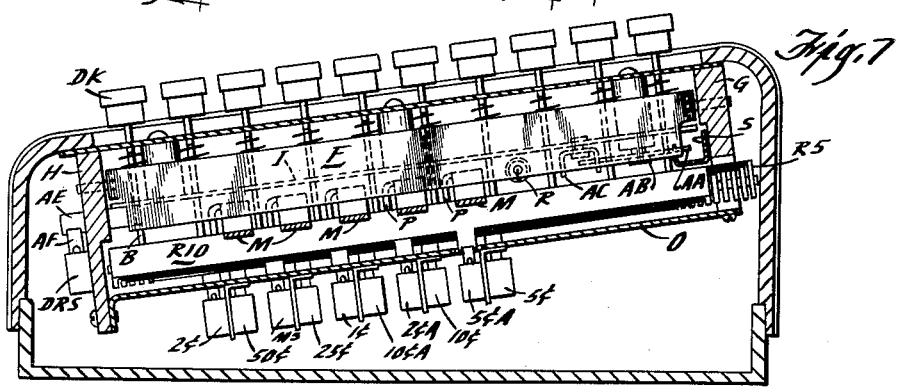
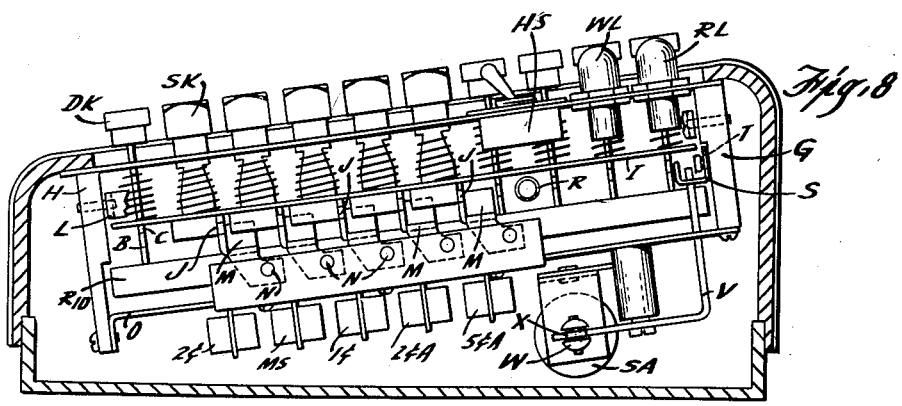

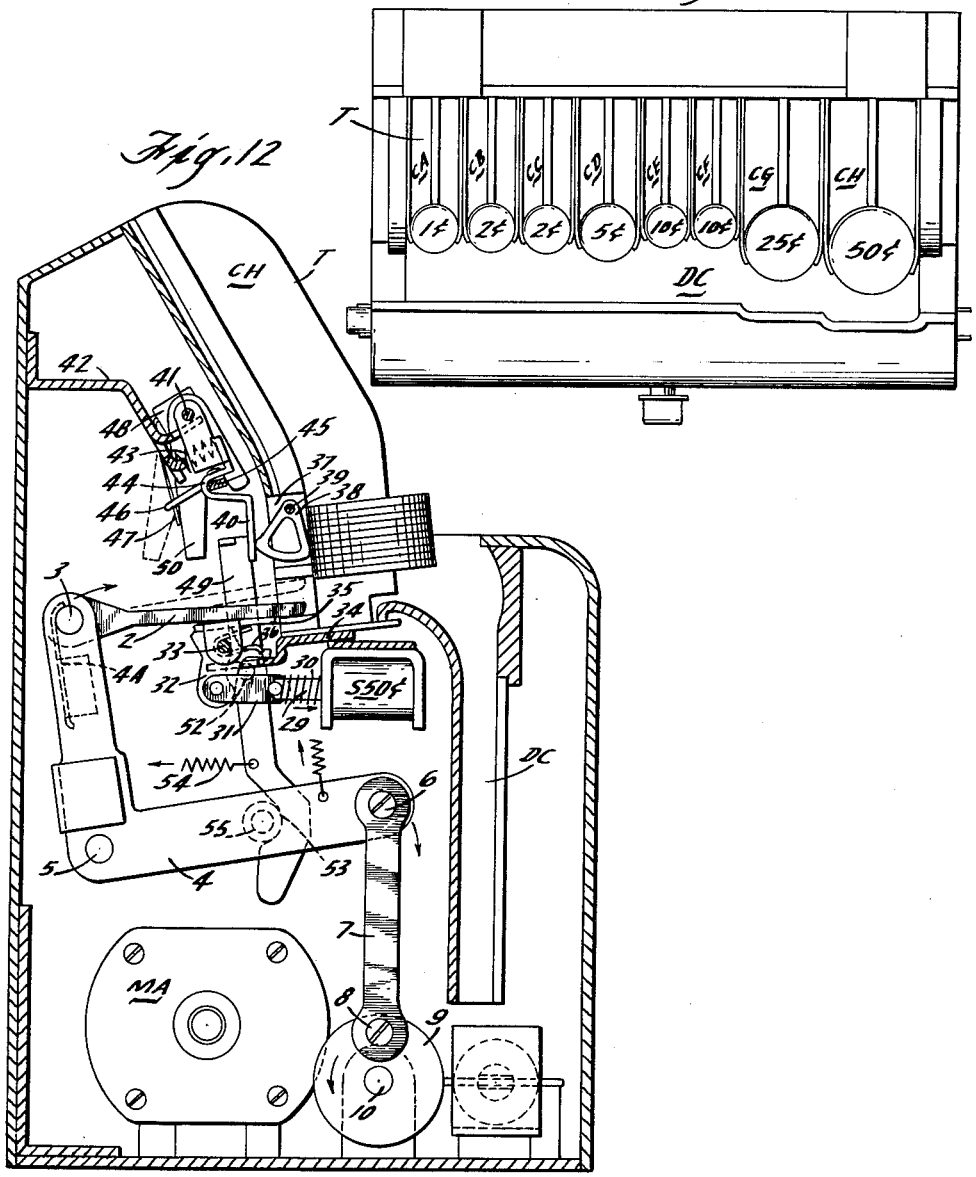

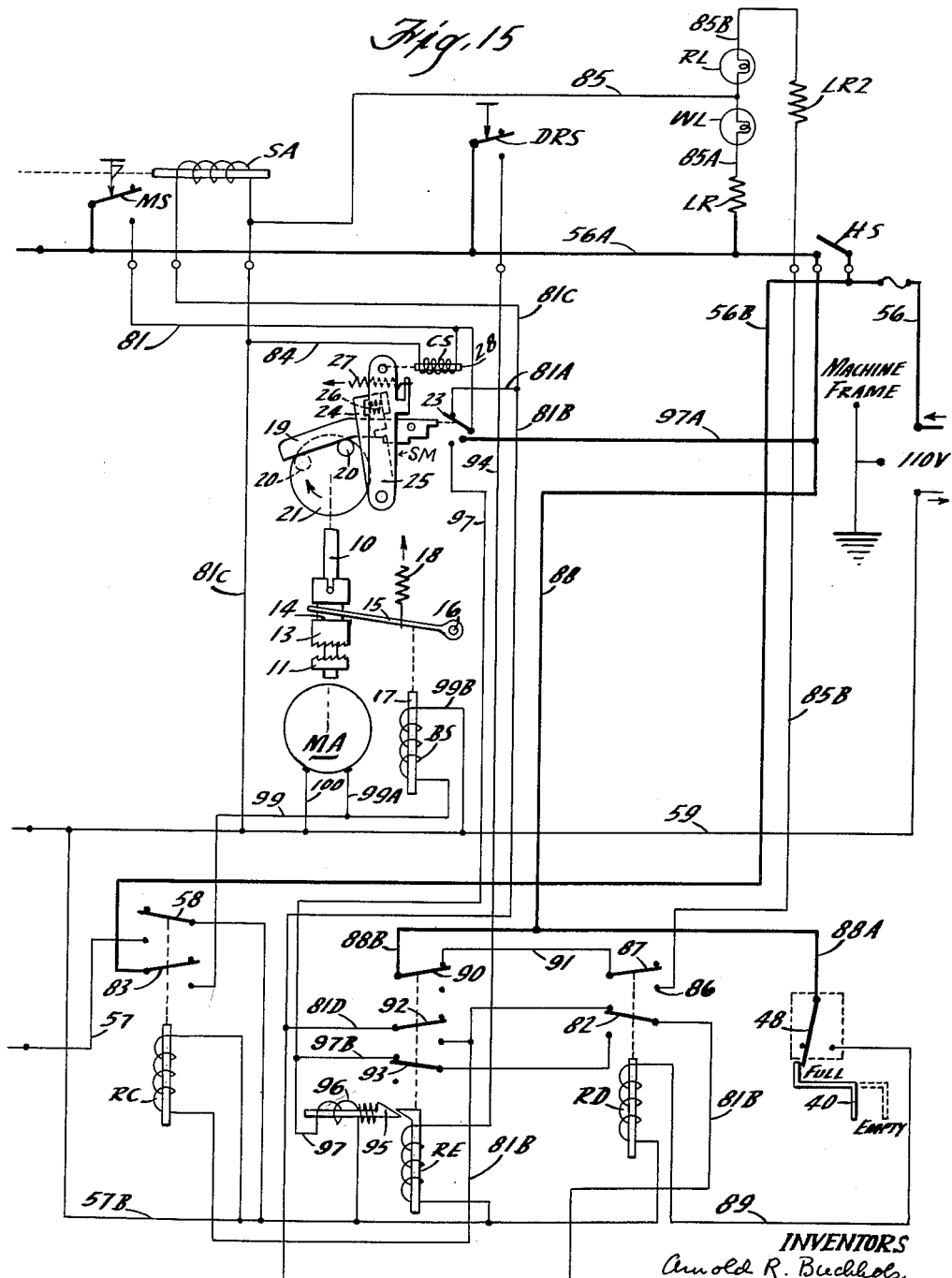

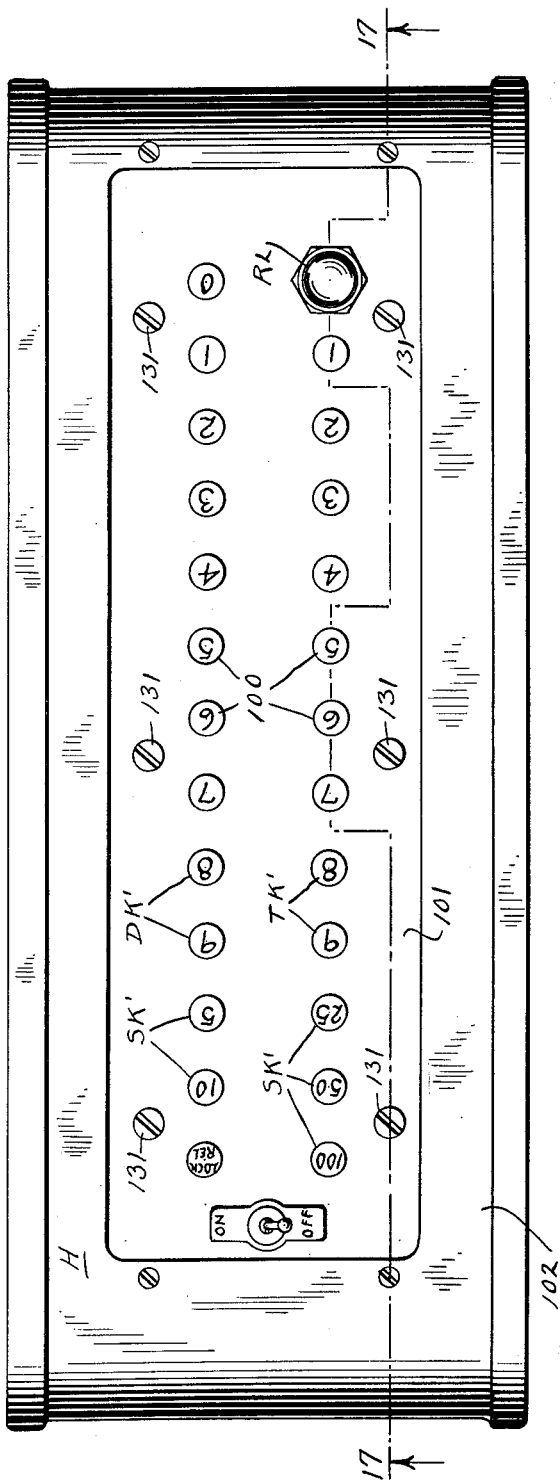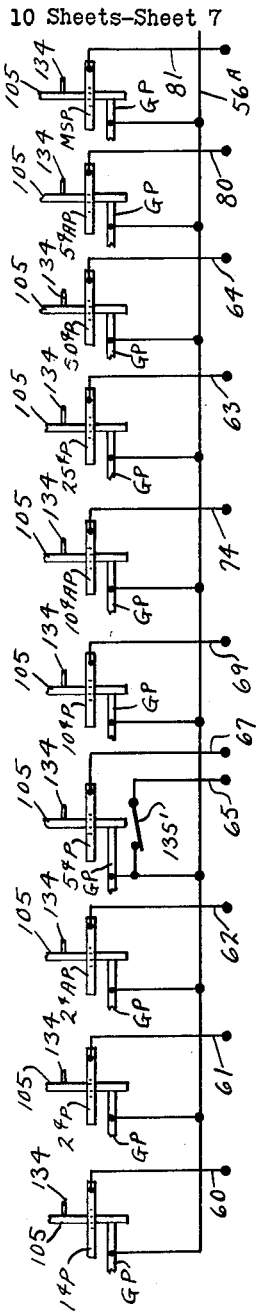

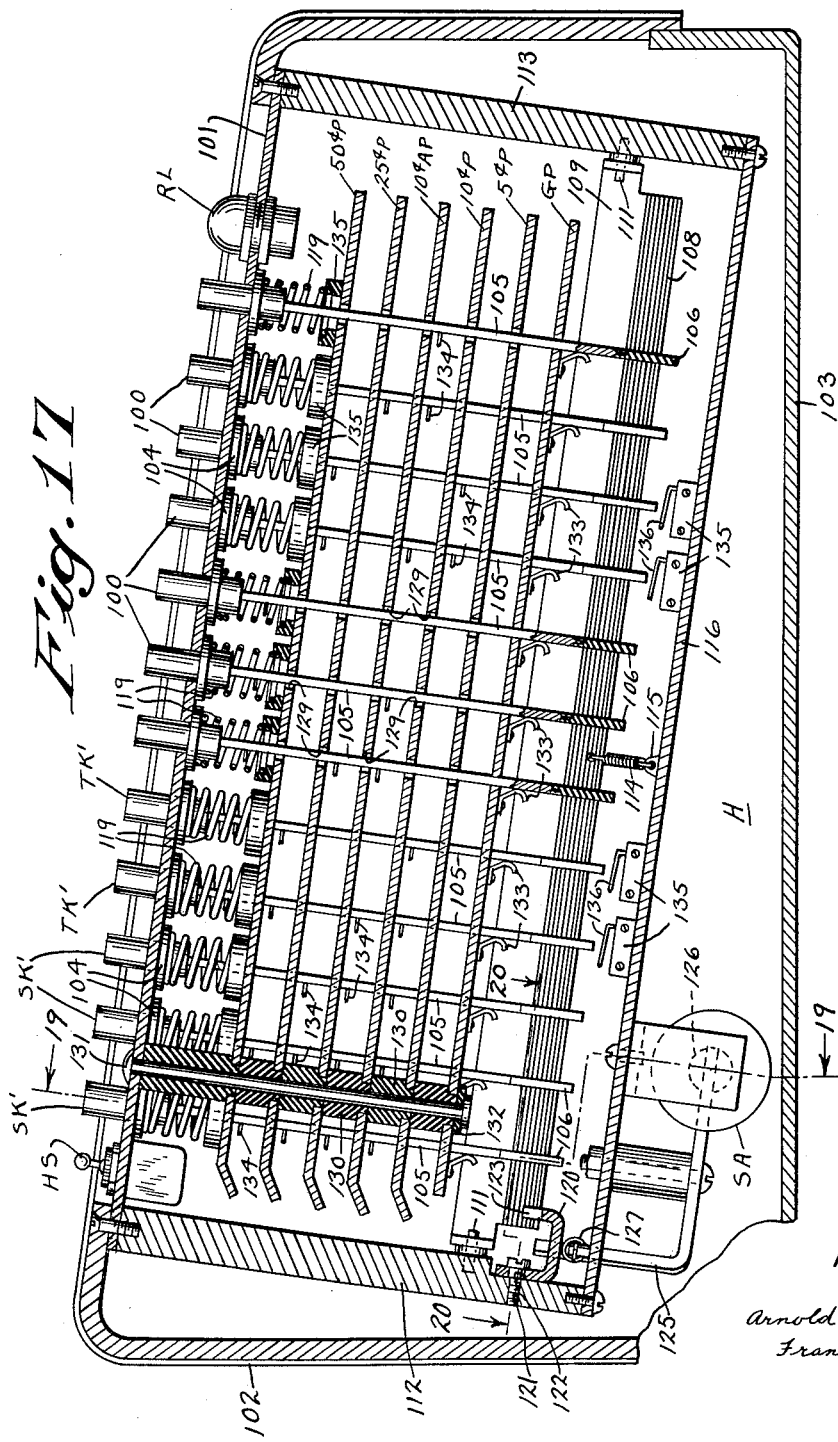

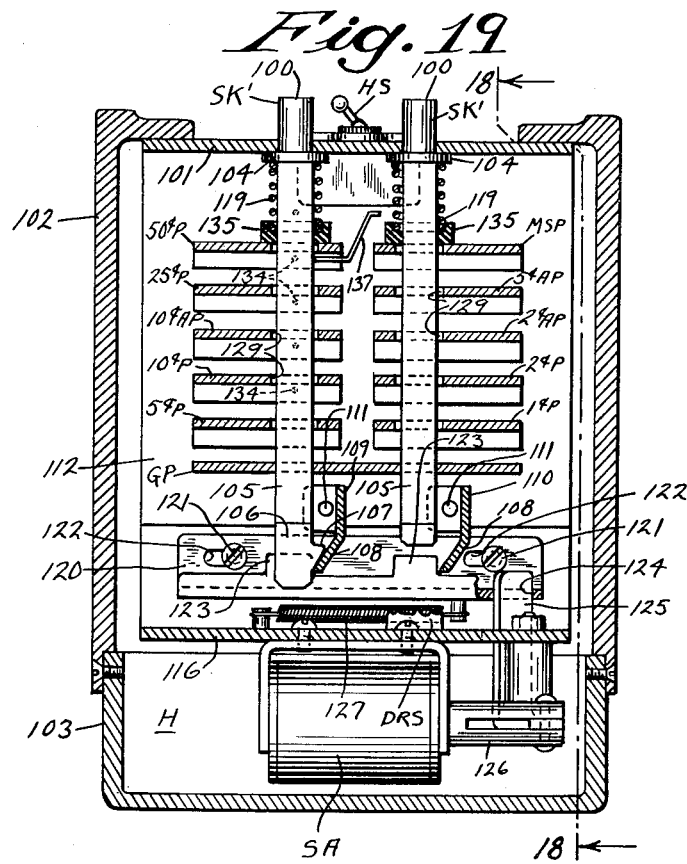
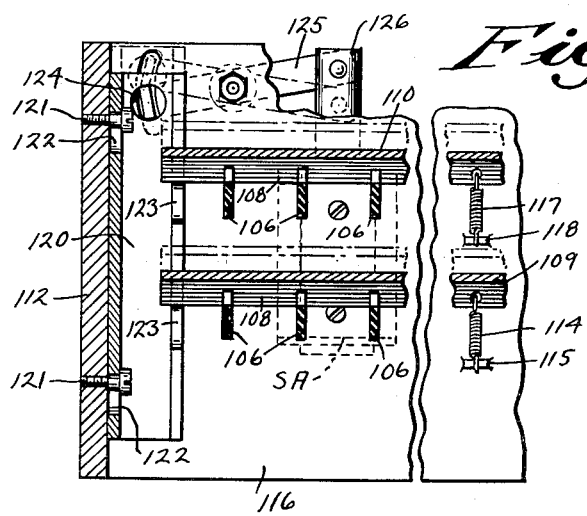

United States Patent Office 3,020,916
Patented Feb. 13, 1962

3,020,916
ELECTRICALLY CONTROLLED COIN
DISPENSING MACHINE
Arnold R. Buchholz and Frank Haban, Watertown, Wis., assignors to Brandt Automatic Cashier Company, Watertown, Wis., a corporation of Wisconsin
Filed Dec. 16, 1958, Ser. No. 782,346
7 Claims. (Cl. 133—2)

The invention relates to coin dispensing machines and more particularly to such machines using electrically controlled coin ejectors, this application being a continuation in part of our copending application Serial No. 725,244, filed March 31, 1958, now abandoned, for Electrically Controlled Coin Dispensing Machine.

The main object of this invention is to provide new and improved control keyboards and electrical devices and circuits controlled thereby for an electrically controlled coin payer dispensing unit in which only nineteen keys are necessary to make payments from one to ninety-nine cents and special keys are provided for paying out specific amounts by the depression of the key. Since there are only nineteen main keys and all amounts paid out can be handled by pressing down on one or two of these keys and an operator can readily memorize the key positions, the paying out of the desired amounts can be made faster than where a keyboard having 1 to 99 keys is used, and in connection with these keyboards a series of special keys have been provided for dispensing split change.

A further object of this invention is to provide circuits controlled by the keys of the keyboard in which the dispensing of coins from the nickel, two dime channels, and quarter channel can be controlled.

The invention further consists in the several features hereinafter described and more particularly defined by claims at the conclusion hereof.

In the drawings:

FIG. 1 is a plan view of one form of keyboard embodying the invention;

FIG. 2 is a vertical sectional view taken on the line 2—2 of FIG. 6;

FIG. 3 is a vertical sectional view taken on the line 3—3 of FIG. 6;

FIG. 4 is a vertical sectional view taken on the line 4—4 of FIG. 6;

FIG. 5 is a vertical sectional view taken on the line 5—5 of FIG. 6;

FIG. 6 is a vertical sectional view taken on the line 6—6 of FIG. 2;

FIG. 7 is a vertical sectional view taken on the line 7—7 of FIG. 2;

FIG. 8 is a vertical sectional view taken on the line 8—8 of FIG. 2;

FIG. 12 is a vertical sectional view through a dispensing unit of a type that may be controlled by a keyboard embodying the invention, the view being taken on the line 12—12 of FIG. 13;

FIG. 13 is a plan view of the dispensing unit shown in FIG. 12;

FIG. 15 is the right hand side of the circuit diagram shown in FIG. 14 associated with parts in the dispensing unit;

FIG. 16 is a plan view of an alternative form of keyboard embodying the invention;

FIG. 17 is a vertical sectional view taken on the line 17—17 of FIG. 16 with certain portions broken away and background details omitted for clarity;

FIG. 19 is a vertical sectional view taken on the line 19—19 of FIG. 17;

FIG. 20 is a broken plan sectional view taken along the line 20—20 of FIG. 17;

FIG. 21 is a circuit diagram showing the key operated switches in the alternative form of keyboard.

The keyboards herein and circuits utilized therewith include features shown and described in the prior copending application of Arnold R. Buchholz and William H. Sprenger, for Coin Dispensing Machine, Serial No. 477,154, filed December 23, 1954, now Patent No. 2,864,385, and also additional keys for operating parts cooperating with parts that may be operated by the main keys to permit the direct dispensing of split change.

Referring to FIG. 1, the keyboard illustrated therein has a left row of tens keys TK, 1 to 9, and a right hand row of digit keys DK, 1 to 9 and zero key, and also a row of special split change keys SK, 5, 10, 25, 50, and 100, a control switch HS, a white light WL, a red light RL, and a "Lock Release" key.

Each of the keys TK, DK, and SK is vertically slidably mounted in frame parts of a two part housing H and urged to a release position by a spring A. Each of the keys TK and DK is provided with a specially formed projecting finger B and as shown in FIG. 2 has a locking notch C so that when any key in a row is depressed, it may be engaged and held down by a latch flange or finger D on a latch bar E or F pivotally mounted at its ends on the legs G and H of the frame, the bar E being disposed adjacent one side of a frame plate I for latching the keys TK and the bar F disposed adjacent the other side of this plate for latching the keys DK. The special keys SK are each provided with a finger J having a locking notch JA so that when any key in this row is depressed, it will be engaged and held down by a latch flange or finger K on a latch bar L also pivotally mounted at its ends on the legs G and H. Unlike the first named keys, each of the keys SK are adapted to engage a projection on a bar M whose angled outer ends are pivotally mounted at N on frame brackets carried by a frame plate O. Each of the bars M has one or more fingers P.

Figure 9:
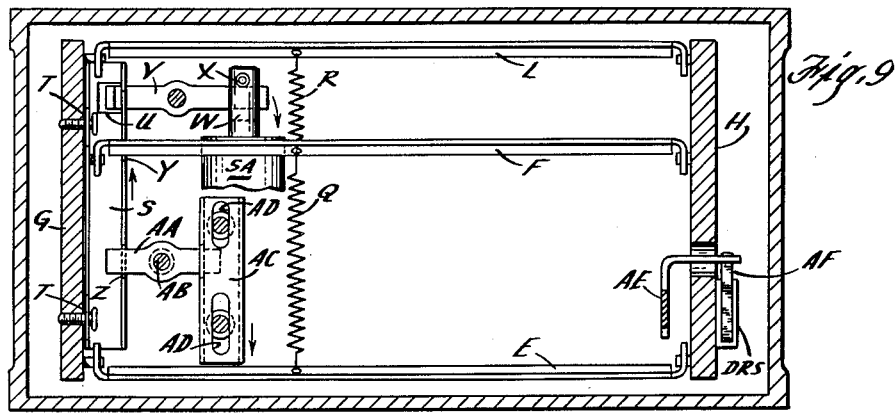
FIG. 9 is a horizontal sectional view taken on the line 9—9 of FIG. 6.

Referring to FIG. 9, the latch bars E and F are normally urged to a latching position by a string Q connected between them and the latch bar L is likewise urged to this position by a spring R connected between this bar and the bar F. Each time a key in any row is depressed, it will shift its associated latch bar to a release position so that only one key in a row is latched down at any one time.

Referring to FIGS. 5, 8, and 9, for releasing the latch bars E, F and L after each cycle of operation of the machine, an angled operating bar S is slidably mounted on the leg G by pin and slot connections T and provided with a slot U to receive the upwardly bent end of one arm of a medially pivoted supported lever V whose other arm works in a slotted end of a plunger W of a key release solenoid SA and is adapted to engage a roller X on the plunger. The bar S also has a slot Y for engagement with one end of the latch bar F and a slot Z for engagement with one arm of a lever AA pivotally supported from the plate I at AB. The other arm of lever AA works in a slot in a channel bar AC slidably mounted by means of pin and slot connections AD on the plate I and adapted to engage the latch bar E. On energization of the solenoid SA the plunger W is retracted to swing the lever V to move the bar S upwardly as viewed in FIG. 9 to swing both the latch bars F and L outwardly to release position and at the same time swing the lever AA so as to move the bar AC downwardly to swing the latch bar E outwardly to a release position.

The spring released "Lock Release" key has an angled foot AE (see FIGS. 6 and 9) which on its downward movement engages the spring actuator arm AF for the depletion release switch DRS which as hereinafter described controls a solenoid.

The fingers B on the tens keys are adapted to engage one or more of a series of rockers R1, R2, R3, R4, and R5 while the fingers B on the digit keys are adapted to engage one or more of a series of rockers R6, R7, R8, R9, and R10. The fingers P of the bars L are adapted to engage those of the rockers R1 to R10 which are appropriate for the purpose of dispensing the desired amount of split change. Each of the rockers is a U-shaped bar whose legs are pivotally mounted on common pivot bars AG mounted in brackets AH on the frame plate O.

Figure 11:
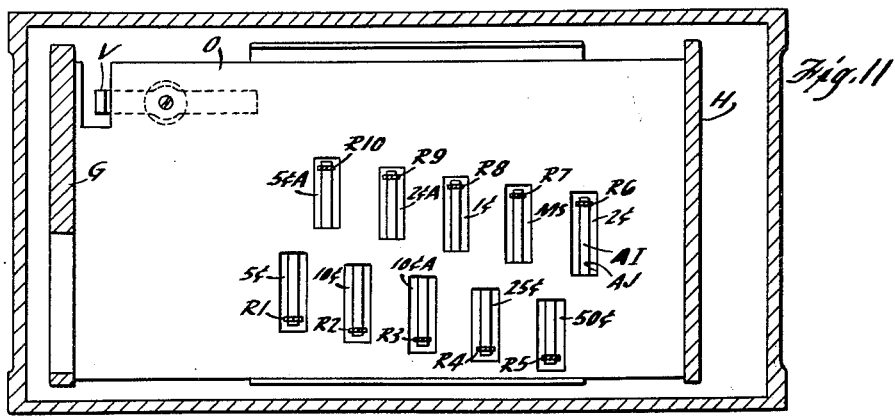
FIG. 11 is a horizontal sectional view taken on the line 11—11 of FIG. 6.

Referring to FIGS. 6, 7, and 11, switches 1¢, 2¢, 2¢A, 5¢, 10¢, 10¢A, 25¢, 50¢, 50¢A, and MS are mounted on the underside of the base plate O so that their spring arm actuators AI project through slots AJ in said plate for engagement with the projections PR of the rockers and acting on said rockers to hold them in their upper positions against projections on the fingers B of the tens and digit keys and the projections P of the bars M (see FIGS. 2 and 4) so that the depression of any one of the keys TK, DK, or SK will act through the appropriate rocker or rockers to move one or more of the actuators AI to close one or more of the above named switches.

As an example of an electrically controlled coin dispensing unit that may be controlled by the above described keyboard, reference may be had to our copending application Serial No. 721,743, filed March 17, 1958, for Electrically Controlled Coin Dispensing Machine, now Patent No. 2,988,092, but in order that the circuits controlled by the keyboard herein described may be understood, parts of a dispensing unit are shown in FIGS. 12 and 13 and will now be described.

The coin dispensing unit has a tray T having a series of coin channels CA, CB, CC, CD, CE, CF, CG, and CH. Channels CA, CB, and CC take one cent coins, channel CD a nickel, channels CE and CF dimes, channel CG quarters, and channel CH half dollars.

A coin ejector mechanism is provided for each coin channel, the ejector mechanisms for the channels CA, CD, CE, CF, CG, and CH being adapted to eject one coin at a time and those for the channels CB and CC two coins at a time into a discharge chute DC, which delivers them to a chute member, not shown, that directs them out of the machine.

Each ejector mechanism is associated with each of the above channels, that for the channel CH being selected as representative of any one of the channels. Each ejector mechanism includes a coin ejector finger 2 working through a slot in the coin tray and pivotally mounted on a transversely disposed shaft 3 carried at its ends in the upper arms of oppositely disposed bell crank levers 4 (one being indicated) that are pivotally mounted intermediate their ends on a transversely disposed pivot shaft 5, said finger being normally urged downwardly by its own weight and guided in a slot of a spacer bar 4a on said lever. The lower arm of each lever 4 is pivotally connected by a pin 6 to one end of a link 7. The other end of the link 7 is pivotally connected to a crank pin 8 on a crank disc 9 mounted on a shaft 10 driven by a motor MA or other suitable electrically operated means.

The drive of the motor MA to the shaft 10 is shown in detail in the above identified application to which reference may be made and is diagrammatically shown here as including a toothed clutch having one member 11 mounted on a motor driven shaft 10 and a shiftable collar member 13 having a slidably keyed connection with the shaft 10 and a grooved portion 14 engaged by a lever 15 pivoted at 16 on the machine frame and pivotally connected intermediate its ends with the plunger 17 of a solenoid BS, said collar and plunger being normally urged to a clutch release position by a spring 18 acting on the lever 15. On energization of solenoid BS, the clutch members 11 and 13 are engaged and the motor through its drive connection with shaft 10 rotates this shaft which through the cranks and links above described reciprocates the links 7 and thereby oscillates the levers 4 which in turn reciprocates the fingers 2.

Associated with the shaft 10 is a switch mechanism SM which is shown in detail in the aforementioned application Serial No. 721,743 and is diagrammatically shown in FIG. 15. This switch mechanism includes an intermediately pivoted lever 19, one end of which is adapted to be engaged by a cam member or eccentrically mounted pin 20 on a disc 21 mounted on the shaft 10 and the other end of which is engageable with the actuator (not shown in detail herein) of a switch 23 so that as the shaft 10 completes its ejector operating cycle, the circuit to the motor and other circuits hereinafter described will be broken. Just before the lever reaches its circuit opening position, it is adapted to be latched by the cooperative action of a latch lever 24 and a latch lever operating lever 25 acting through a spring 26, the lever 25 being normally urged to a release position by a spring 27. The lever 25 is moved to its actuating position by its operative connection with the plunger 28 of a solenoid CS which is energized during the dispensing cycle to effect said latching.

To render any one of the fingers 2 effective to dispense coins from its associated coin channel, each finger is raised to a coin dispensing position by a solenoid operated means which in FIG. 12 has been shown in detail in connection with the solenoid S50¢ whose plunger 29, normally moved to a return position by a spring 30, is operatively connected by a link 31 with one arm of a lever 32 pivotally mounted on a pin 33 suitably carried by a shelf 34. A second lever 35, engaging the ejector finger 2, is also pivotally mounted on the pin 33 and a spring 36 is interposed between these levers 32 and 35 so that the lever 35 is swung upwardly by pressure exerted through spring 36 when lever 32 is swung counterclockwise on the energization of solenoid S50¢, and this acts to swing the ejector finger 2 from its full line to its dotted line position, as shown in FIG. 13, so that on its forward stroke or movement toward the right it ejects a half dollar from the coin channel CH.

Means are provided to prevent the operation of the machine in the event of a coin depletion in any one of the coin channels and then permit only one or more specially controlled operations before the depleted channel is refilled.

Referring to FIG. 12, each coin channel has a slot 37 and a coin engaging lever or finger 38 is pivotally mounted at its upper end 39 to work in said slot. Each finger 38 is yieldingly held against the stack of coins in its associated channel by a lever 40 pivotally mounted at its upper end on a transversely extending shaft 41 carried by a shelf 42 and urged against the finger by a spring 43. Each of the levers 40 has a notch 44 formed therein and the transverse portion of a pivotally supported bar 45 is seated in said notch, so that clockwise movement of said bar will act on all of the levers 40 to release their spring loading of the fingers 38. The bar 45 carries an apertured bracket arm 46 in which the outer end of an actuator 47 for a normally open switch 48 is mounted. When a coin depletion in any one of the channels occurs, the finger 38 of that channel is free to move outwardly into its associated channel and its lever 40 under the action of its spring 43 is swung toward the right as viewed in FIG. 12 to in turn swing the bar 45 counterclockwise so that its arm 46 presses on the actuator 47 to close the switch 48, and as hereinafter described the closing of this switch acts to open the motor circuit to stop further action of the machine. Further operations of the machine are permitted as hereinafter described by the operation of the "Lock Release" key in the keyboard prior to the depressing of a dispensing key.

To permit the coins in the channels to feed downwardly freely, on each dispensing operation of the machine pressures of the levers 40 on the fingers 38 are momentarily relieved by the engagement of a lever 49 with a lever 50 on the shaft 41 which is adapted to engage the bar 45. The lever 49 is operated in proper cyclic sequence with the levers 4 and for this purpose is pivotally mounted intermediate its ends on a pivot 52 and has a cam notch 53 held by a spring 54 against a roller 55 carried by one of the levers 4 so that, as lever 4 swings down, the upper bent end of lever 49 engages the lever 50 to swing it clockwise and with it the bar 45 and levers 40 engaged thereby to swing them away from their fingers 38 to relieve the pressure on said fingers.

Figure 10:
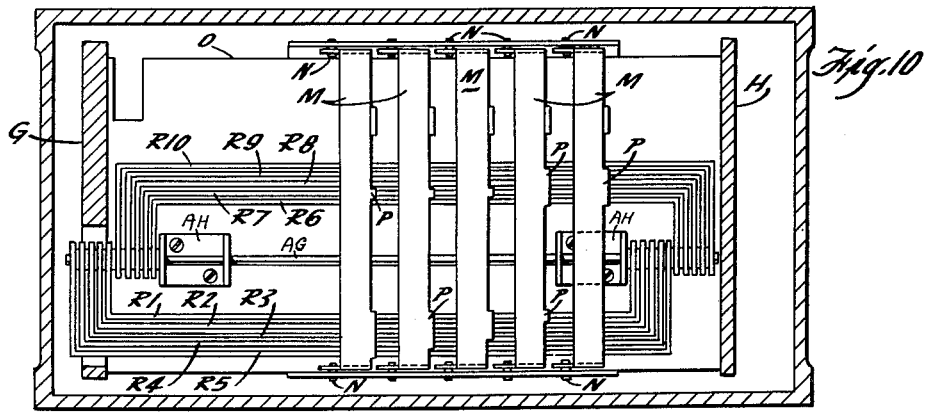
FIG. 10 is a horizontal sectional view taken on the line 10—10 of FIG. 6.
Figure 14:
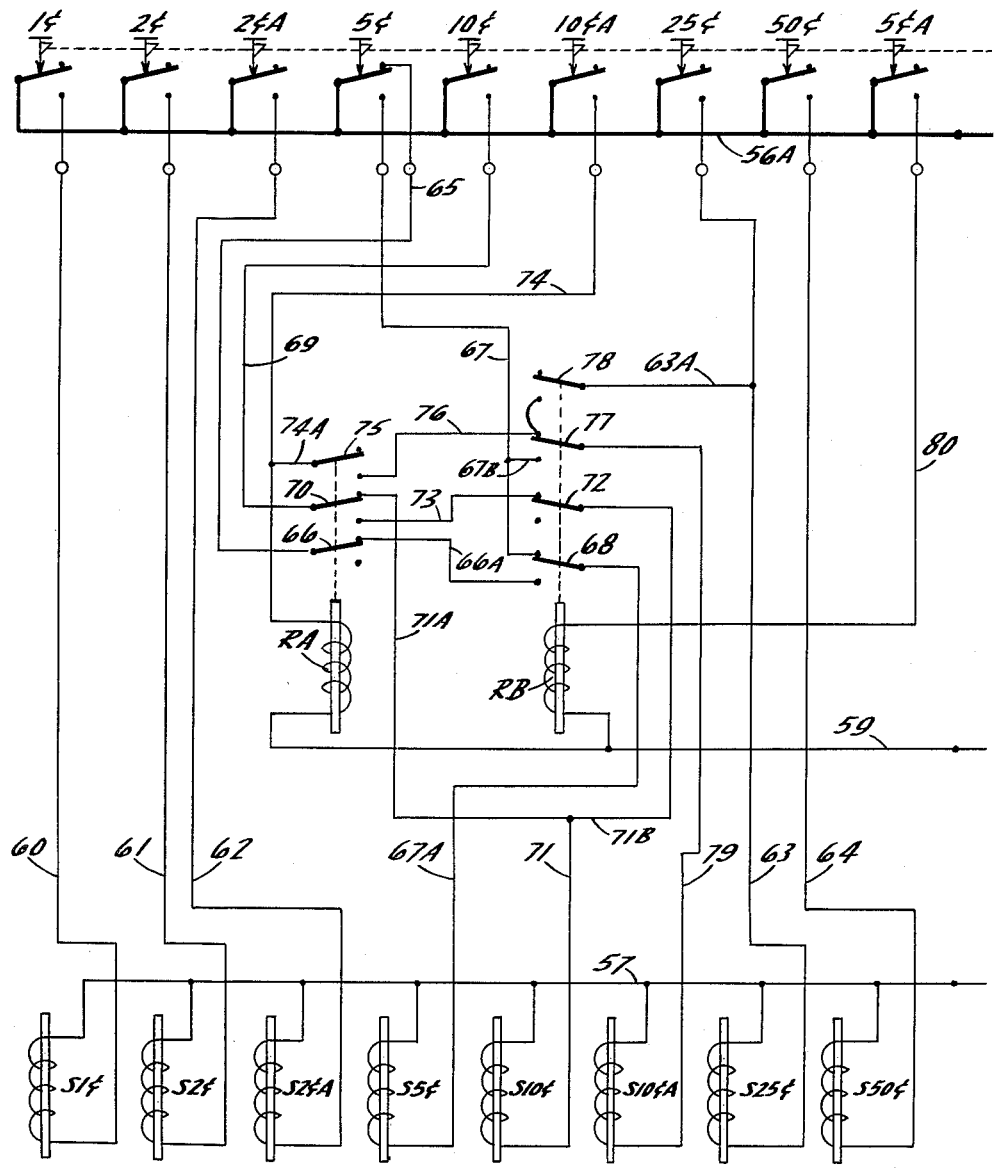
FIG. 14 is the left hand side of a circuit diagram for circuits controlled by the keyboard.

Referring to FIGS. 10, 11, and 14, the following table designates the key, the rocker or rockers it operates, and the switches operated by said rockers.

|  | Rockers | Switches |
|---|---|---|
| The DK Key: | | |
| 1 | R7, R8 | MS, 1¢. |
| 2 | R7, R6 | MS, 2¢. |
| 3 | R7, R8, R9 | MS, 1¢, 2¢A. |
| 4 | R7, R6, R9 | MS, 2¢, 2¢A. |
| 5 | R7, R10 | MS, 5¢A. |
| 6 | R7, R10, R8 | MS, 5¢A, 1¢. |
| 7 | R7, R10, R6 | MS, 5¢A, 2¢. |
| 8 | R7, R10, R8, R9 | MS, 5¢A, 1¢, 2¢A. |
| 9 | R7, R10, R6, R9 | MS, 5¢A, 2¢, 2¢A. |
| 0 | R7 | MS. |
| The TK Key: | | |
| 1 | R2 | 10¢. |
| 2 | R2, R3 | 10¢, 10¢A. |
| 3 | R1, R4 | 5¢, 25¢. |
| 4 | R1, R2, R4 | 5¢, 10¢, 25¢. |
| 5 | R5 | 50¢. |
| 6 | R2, R5 | 10¢, 50¢. |
| 7 | R2, R3, R5 | 10¢, 10¢A, 50¢. |
| 8 | R1, R4, R5 | 5¢, 25¢, 50¢. |
| 9 | R1, R2, R4, R5 | 5¢, 10¢, 25¢, 50¢. |

The rockers are normally urged upwardly to a release position by the spring actuators for the switches they control.

Referring to FIGS. 14 and 15, a current supply line 56 has branch conductors 56A and 56B, conductor 56A including a manually operated switch HS. One side of each of the switches 1¢, 2¢, 2¢A, 5¢, 10¢, 10¢A, 25¢, 50¢, 5¢A, MS is connected with the conductor 56A. The coils of solenoids S1¢, S2¢, S2¢A, S25¢, and S50¢ are direct connected across the conductor 56A and a conductor 57 by conductors 60, 61, 62, 63, and 64 respectively. Conductor 57 includes a switch 58 and connects with a conductor 57B that connects with a return line conductor 59.

The switch 5¢ in its normal position connects conductor 56A with a conductor 65 having a switch 66 therein connected with a conductor 66A and in its operated position connects by a conductor 67 through a switch 68 to a conductor 67A that includes the coil of the solenoid S5¢.

The switch 10¢ is connected by a conductor 69 to a switch 70 that connects with a branch conductor 71A of a conductor 71 including the coil of solenoid S10¢. Another branch conductor 71B connects by a switch 72 to a conductor 73 that may be connected by switch 70 with conductor 69. The switch 10¢A is connected by a conductor 74 to the coil of relay RA and the return and also has a branch 74A connected by a switch 75 with a conductor 76 that may connect with either a switch 77 or a switch 78. Switch 77 is connected by a conductor 79 with the coil of solenoid S10¢A and switch 78 is connected by a branch conductor 63A to conductor 63.

The switch 5¢A connects conductor 56A with a conductor 80 connected with the return line 59 and including the coil of a relay RB. The relay RA includes the switches 66, 70, and 75 and the relay RB includes the switches 68, 72, 77, and 78.

The motor circuit is always energized for each coin dispensing operation, either by the depression of any one of the digit keys or the depression of the zero key when any one of the tens keys is depressed. This circuit is initiated by the closure of the switch MS so that current can flow from conductor 56A via a conductor 81, switch 23, a conductor 81A to branch conductors 81B and 81C. Conductor 81B includes a switch 82 and the coil of a relay RC that controls the switch 58 and a switch 83. Conductor 81C includes the coil of solenoid SA. The coil of solenoid CS is in a conductor 84 connected across the conductors 81 and 81C.

A return conductor 85 connected with the return end of conductor 81C connects with branch conductors 85A and 85B. Conductor 85A connects with conductor 56A and includes a resistance LR and the white light WL. Conductor 85B connects with a contact 86 for a switch 87 and includes a resistance LR2 and the red light RL.

The switch 48 is in a circuit including a conductor 88A and a conductor 89 including the coil of a relay RD which controls the switches 87 and 82. Conductor 88A is a branch of a conductor 88 that connects with conductor 56A. Another branch conductor 88B of conductor 88 connects with a switch 90 which in one position is connected by a conductor 91 with switch 87.

A latching type relay RE controls the switch 90 and switches 92 and 93. The coil of relay RE is energized on closing of depletion release switch DRS by passage of current through a conductor 94 including said coil and switch. In its upper position the relay RE is latched in by a spring pressed latch 95 which forms part of the plunger of a solenoid whose coil 96 is energized through passage of current through a conductor 97 adapted through switch 23 to connect with a conductor 97A that connects with conductor 88. Conductor 81B has a branch conductor 81D including switch 92 for connection with conductor 81B. A branch conductor 97B from conductor 97 includes a switch 93 for connection through switch 82 with another part of conductor 81B.

Conductor 56B connects through switch 83 with a conductor 99 having a branch conductor 99A connected with one terminal of the motor MA and a branch conductor 99B including the coil of clutch operating solenoid BS. The other terminal of the motor MA is connected by a conductor 100 with the return line 59.

With the circuit arrangements above described, if the operator presses down any one of the keys DK shown in FIG. 1 from 1 to 9, the corresponding amount in cents value will be dispensed by the machine. When any one of the DK keys is depressed, it moves the rocker R7 to actuate the motor switch MS, which rocker may also be operated by the zero key. When the number 1 key DK is depressed, rocker R8 is depressed to close switch 1¢, and current flows from the line 56A through switch 1¢, conductor 60 and 57, and at the same time current flows from conductor 56A through switch MS, conductor 81, switch 23, conductors 81A and 81B, coil of relay RC and return conductors 57B and 59. Energization of relay RC moves switch 58 to its other position to connect conductor 57 to return conductors 56B and 59 so that current from solenoid S1¢ is completed to energize this solenoid to shift the ejector finger 38 for the penny channel CA to operative position, and switch 83 is also moved to its other position so that current flows from conductor 56, switch 83, conductors 99 and 99A, motor MA, conductor 100 to return 59 to energize said motor and flows to conductor 99B to return line 59 through coil of solenoid BS to energize this solenoid and thereby operate the clutch heretofore described to connect the motor driven shaft 10 to operate the ejector mechanisms as heretofore described so that a penny is delivered from the channel CA to the discharge chute DC. On closure of the motor switch MS current from the line also passes from conductor 81A to conductor 81C including the coil of relay SA whose plunger as previously explained is operatively connected to the lever U which through mechanism previously described acts to release the latch bars E, F and L so that any depressed key will be returned by its spring to its initial position. As the shaft 10 rotates, the switch mechanism SM is operated to shift switch 23 to its other position to open the circuit to solenoid CS and the circuits to relay RC and hence the motor MA and the clutch and a circuit is then established from conductor 56A to conductor 97A, switch 23, conductor 97, including coil of solenoid 96, to return conductors 57B and 59 to energize this coil to move latch 95 to a release position.

When the number 2 key DK is depressed, the rockers R7 and R6 are moved to close the switches MS and 2¢ and the action is the same as in depressing the number 1 key DK except that current flows through conductor 56A and conductor 61 and the coil of solenoid S2¢ to set the finger for the channel CB in operative position so that as the events of the previously described cycle occur, two pennies will be delivered from channel CB.

Depression of the number 3 key DK acts to operate rockers R7, R6, and R9 to actuate switches MS, 1¢, and 2¢ to energize solenoid S1¢ as previously described and through conductor 62 energize solenoid S2¢A so that when the motor is operated, one cent will be discharged from channel CA and two cents will be discharged from channel CC.

When the number 4 key DK is depressed, rockers R7, R6, and R9 are operated to close switches MS, 2¢, and 2¢A so that solenoids S2¢ and S2¢A are operated so that on operation of the motor two cents will be discharged from each of the channels CB and CC.

Depression of the number 5 key DK acts to operate rockers R7 and R10 to operate switches MS and 5¢A. On closing of switch 5¢A, relay RB is energized shifting switch 68 to its other position so that current now flows from conductor 56A, switch 5¢ in its (initial position) conductor 65, switch 66, conductor 66A, switch 68, conductor 67A including coil of solenoid S5¢ to return line 57 to energize this solenoid so that when the motor is operated, five cents will be discharged from the channel CD.

When the keys 6 to 9 are respectively operated, the rockers R7 and R10 will be operated to operate the switch MS and 5¢A in the same way as the number 5 key DK and in addition the rockers operated by the keys 1 to 4 as previously described will be respectively operated to dispense 1 to 4 cents from the coin channels previously mentioned to make up the amounts of six to nine cents.

For paying 10¢, the number 1 key TK of the first row is depressed followed by the depression of the zero key to actuate the rockers R2 and R7 to actuate the switches 10¢ and MS. On closure of switch 10¢ current from conductor 56A flows through conductor 69, switch 70, conductors 71A and 71 to return line 57 energizing the coil of solenoid S10¢ and then through the closure of switch MS the motor circuit is established as previously described to discharge ten cents from the channel CE.

For paying 11¢ to 14¢, the action is the same as the ten cent payment with the addition of 1 to 4 cents by the operation of the rockers operated by the keys 1 to 4 as previously described.

For paying 15¢, the number 1 key TK and the number 5 key DK are depressed, and the action is the same as that described above to respectively energize solenoid S10¢ and S5¢.

For paying 16¢ to 19¢, the action is the same as for 15¢ except that in pressing down the digit keys 6 to 9, one cent to four cents will be added to the five cents dispensed on the operation of the switch 5¢A by any of these keys, the number 1 key TK supplying the ten cents.

For paying 20¢, the number 2 key TK is depressed to operate rockers R2 and R3 to actuate switches 10¢ and 10¢A. On closure of switch 10¢A relay RA is energized through current flow in conductor 74 to shift switches 66, 70, and 75 to their other positions so that with switch 10¢ connecting conductor 69 with switch 70, conductor 71A and conductor 71, including the coil of solenoid S10¢, this solenoid is energized and with switch 10¢A connecting conductor 74 with conductor 74A, switch 75, conductor 76, switch 77, conductor 79, including coil of solenoid S10¢A, this last named solenoid is energized so that on operation of the motor circuit MS by the zero key, ten cents will be discharged from channel CE and ten cents from channel CF.

For paying 21¢ to 24¢, the number 2 key TK acts to dispense twenty cents as previously described, and the actuation of the DK keys 1 to 4 adds the desired amount in pennies.

For dispensing 25¢, the number 2 key TK and the number 5 key DK are depressed to operate rockers R2, R3, R7, and R10 to actuate switches 10¢, 10¢A, MS, and 5¢A. The closing of switch 10¢A through connection of conductor 74 including the coil of relay RA energizes this relay, and the closing of switch 5¢A we have seen energizes relay RB. With relays RA and RB energized, the switches controlled thereby are shifted so switches 66 and 70 are moved to their other positions to cut out solenoids S10¢ and S10¢A, but with switch 10¢A closed and switches 75 and 78 shifted to their other positions, current from conductor 56A flows through conductors 74 and 74A, switch 75, conductor 76, switch 78, conductors 63A and 63 to the return line and coil of solenoid S25¢ is energized so that with the motor circuit closed, twenty-five cents is discharged from channel FG.

For payments of 26¢ to 29¢, the action is the same as for 25¢ except the depression of DK keys 6 to 9 adds 1 to 4 cents to the twenty-five cents dispensed.

For the payment of thirty cents, the number 3 key TK and zero key are depressed to operate rockers R1, R4, and R7 to actuate switches 5¢, 25¢, and MS. Closure of switch 5¢ we have seen energizes solenoid S5¢ and closure of switch 25¢ establishes line current through conductor 63 including coil of solenoid S25¢ to energize this solenoid so that 5¢ and 25¢ are respectively discharged from channels CD and CG.

For paying 31¢ to 34¢, the depression of the number 3 key TK and the appropriate DK key 1 to 4 accomplishes this result.

For paying 35 cents, the number 3 key TK and 5 key DK are depressed to operate rockers R1, R4, R10, and R7 to actuate switches 5¢, 25¢, 5¢A, and MS. Closing of switch 5¢A energizes relay RB to shift switches 68, 72, 77, and 78 to their other positions so that instead of solenoid S5¢ being energized, solenoid S10¢A is energized, the circuit being conductor 56A, switch 5¢, conductor 67, conductor 67B, switch 77, conductor 79 including coil of solenoid S10¢A to return so that ten cents is added to the twenty-five cents dispensed on closing of switch 25¢ and the motor switch MS.

For paying 36¢ to 39¢, the operation is the same as for 35¢, the digit keys 6 to 9 being depressed instead of the five key which in each instance also involves the closure of switch 5¢A to energize solenoid S10¢A to which the pennies 1 to 4 are added.

For paying 40 cents, the number 4 key TK and zero key are depressed to operate rockers R, R2, and R4 to actuate switches 5¢, 10¢, and 25¢ and switch MS as previously described to which the amounts of 1 to 4 cents are added by the depression of the digit keys 1 to 4 for 41¢ to 44¢.

For paying 45 cents, the number 4 key TK and 5 key DK are operated, and as in the thirty-five cent operation the operation of the switch 5¢A energizes solenoid S10¢A with solenoids S10¢ and S25¢ energized, two ten cents and a quarter are dispensed.

For paying 46¢ to 49¢, the action is the same as for 45 cents with the addition furnished by operation of keys 6 to 9.

For paying 50¢, the 5 key TK and zero key are depressed to actuate switches 50¢ and MS. On closing switch 50¢, current flows from conductor 56A through conductor 64 to the return to energize solenoid S50¢ so that fifty cents is dispensed from channel GH.

As all the dispensing circuits have now been described the dispensing of 55¢ to 99¢ will be clear from the table heretofore appearing herein.

As previously noted, the operation of the special keys SK operate the bars M having the fingers P thereon. The bar M actuated by the number 5 key SK has projections P that actuate rockers R7, R6, R8, and R9 to close switches MS, 2¢, 1¢, and 2¢ to dispense five pennies. The bar M actuated by the number 10 key SK actuates the rockers R7, R6, R8, R9, and R10 to close switches MS, 2¢, 1¢, 2¢A, and 5¢ to dispense five pennies and a nickel. The bar M actuated by the number 25 key SK actuates the rockers R2, R3, R7, and R10 to actuate switches 10¢, 10¢A, MS, and 5¢A to dispense two dimes and a nickel. The bar M actuated by the number 50 key SK actuates the rockers R2, R3, R4, R7, and R10 to actuate switches 10¢, 10¢A, 25¢, MS, and 5¢A to dispense two dimes, a nickel, and a quarter. The bar M actuated by the number 100 key SK in addition to operating the rockers and switches mentioned above in connection with the 50 key SK also operates the rocker R5 to actuate switch 50¢ to dispense two dimes, a nickel, a quarter, and a half dollar.

In the event of a coin depletion in any one of the coin channels, the switch 48, as shown in FIG. 15, is moved to establish a circuit connection with the conductor 89 so that current from conductors 88 and 88A passes through switch 48 and conductor 89 to return conductor 75B energizing the coil of relay RD. On energization of relay RD, switches 82 and 87 are shifted to their other positions. Shifting of switch 87 to its other position establishes current flow from conductors 88 and 88B, switch 90, conductor 91, switch 87, conductor 85B including the red light RL to return conductors 85, 81C, and 59, thus lighting the red light. The shifting of switch 82 to its other position breaks the circuit through conductor 81B to relay RC so that this relay is deenergized and switches 83 and 58 assume their initial positions, thereby cutting out the circuit to the motor MA and the clutch solenoid BS and thus stop further operations of the machine.

One or more additional operations can be effected by the operator connecting the switch DRS with conductor 94 since under these conditions relay RE is energized shifting switches 92 and 93 to their other positions so that when the switch MS is depressed through the operation of either one of the digit keys, current from conductor 56A, switch MS, conductor 81C, conductor 81D, switch 92, and a part of conductor 81B including the coil of relay RC to the return conductor 57B again energizes the coil of relay RC to shift switches 58 and 83 to their other positions and thus permits another dispensing cycle in the same way as a normal dispensing cycle.

In the following description, and particularly with reference to FIGS. 16 to 21, like designations are given to parts corresponding to those hereinbefore described.

Referring now to FIG. 16, which illustrates an alternative keyboard structure, there is shown, a left hand row of tens keys TK', 1 to 9, together with special split change keys SK' 25, 50 and 100, and a right hand row of digit keys DK' 1 to 9 and zero, together with special split change keys SK' 5 and 10, and a "Lock Release" key. There is also shown a red light RL and a control switch HS, the structure and operation of which is hereinbefore described.

Figure 18:
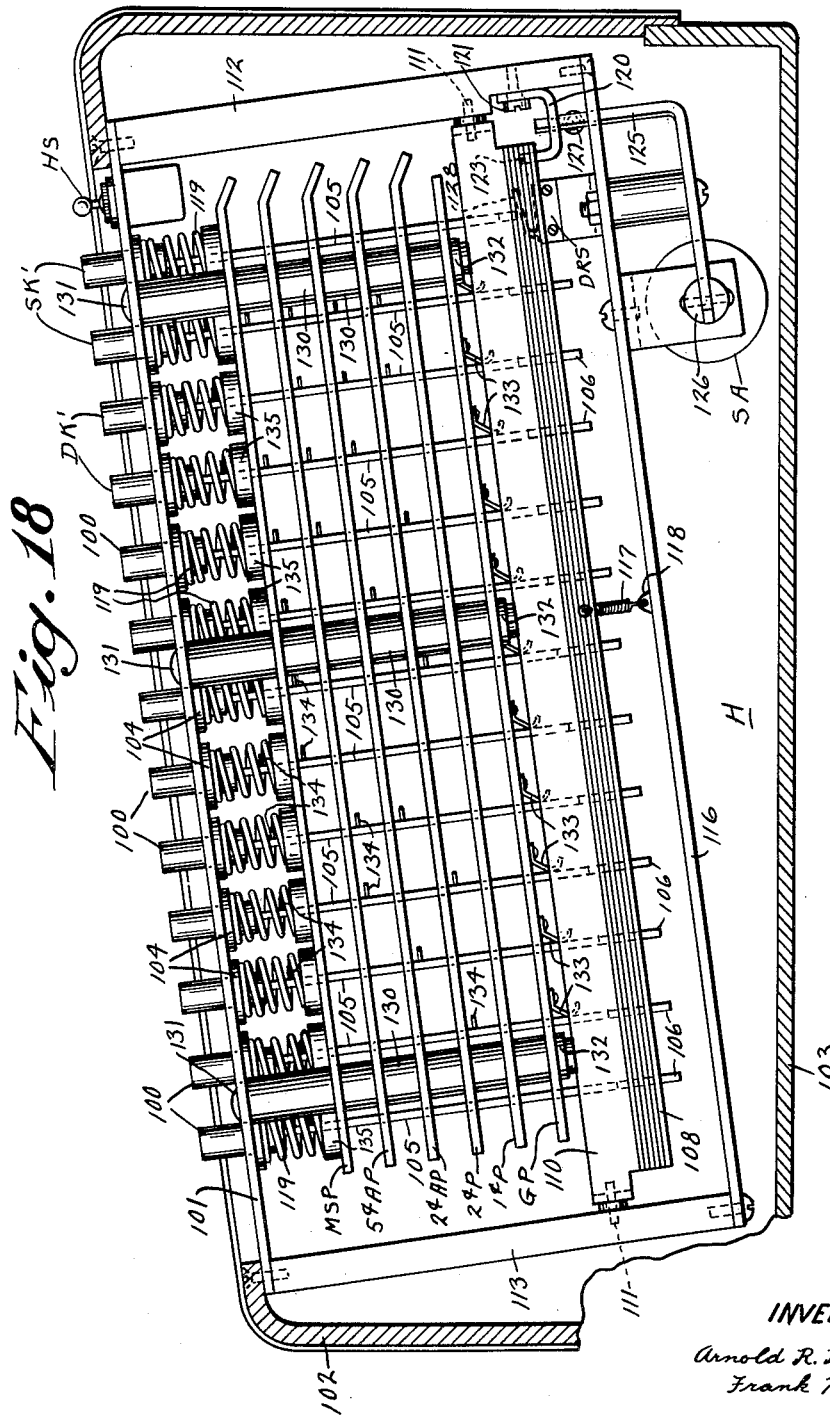
FIG. 18 is a vertical sectional view taken on the line 18—18 of FIG. 19 with background details omitted for clarity.

As shown in FIGS. 17 to 19, each of the keys TK', DK' and SK' includes an insulated push button 100 which is vertically slidably mounted in a top panel 101 attached to a two piece housing H consisting of an upper portion 102 and a lower portion 103. A flange 104 carried at the lower side of each of the push buttons 100 is adapted for contact with the under side of the top panel 101 to limit the upward travel of the push buttons 100. Bonded to and depending downwardly from each of the push buttons 100 is an electrically conductive push rod 105. At its lower end, each of the push rods 105 is fitted with an extension 106 of wear resistant insulating material, which extension 106 carries a locking projection 107. The projection 107 is adapted to be engaged by a latch flange 108 on either of latching rockers 109 and 110, when any key in a row is depressed, latching rocker 109 being associated with the keys in the tens keys TK' row and rocker 110 being associated with the keys in the digits keys DK' row. Each of the rockers 109 and 110 is longitudinally pivoted being supported at its ends on pins 111 secured to frame end plates 112 and 113. The latching rocker 109 is biased in a clockwise rotational direction, as viewed in FIG. 19, by means of a spring 114 (FIG. 20) connected between the latch flange 108 of rocker 109 and a lug 115 projecting from a frame bottom 116. Similarly, the rocker 110 is urged in a clockwise rotational direction, as viewed in FIG. 19, by means of a spring 117 connected between the latch flange 108 of rocker 110 and a lug 118 projecting from the frame bottom 116.

Each of the keys TK', DK' and SK' is biased upwardly by a compression spring 119 which engages the underside of a key flange 104 and is seated at its other end as described hereinafter. When a key in any row is depressed, one of the latch flanges 108 of rockers 109, 110 is arranged to engage the projection 107 on the extension 106 to thereby hold the key depressed. However, when another key in the same row is depressed, the associated latch flange 108 is shifted to a release position, to thereby release the original key so that only one key is latched at any particular time, in the same manner as previously described in connection with FIG. 9.

Referring to FIGS. 17–20, for shifting the latch flanges 108 of rockers 109 and 110 to release position after each cycle of operation of the machine, a U-shaped operating bar is slidably mounted on the frame end plate 112 by means of cap screws 121 inserted through extended slots 122 in the bar 120. A pair of upwardly directed projections 123 are carried by the bar 120 and are arranged so as to contact the latch flanges 108 of latching rockers 109 and 110 when the operating bar 120 is moved to the right, as viewed in FIG. 19, to rotate the rockers 109 and 110 in a counter clockwise direction. The operating bar 120 is biased to the left by means of a tension spring 127 pinned to the bar 120 and the bottom plate 116, and is provided with a slot 124 to receive the upwardly bent end of one arm of a medially pivotally supported lever 125, the other arm of which is pivotally secured in the slotted end of a plunger 126 of a key release solenoid SA supported at the under side of the frame bottom 116. On energization of the solenoid SA, the plunger 126 is retracted to swing the lever 125 to the dotted line position shown in FIG. 20 and to thereby slide the operating bar 120 to its release position.

Referring to FIG. 19, the "Lock Release" key is arranged similarly as in the case of keys TK', DK', and SK', however, it does not carry a locking projection 107 and accordingly is spring released after depression under the action of the spring 119. On the downward movement of the "Lock Release" key, its extension 106 is adapted to contact the actuating lever 128 of a depletion release switch DRS which in turn controls the energization of solenoid RE as described above.

Each of the push rods 105 of the coin dispensing keys TK', DK' and SK' is inserted into aligned apertures 129 in a group of horizontally stacked plates P which are suitably spaced from one another by cylindrical spacing insulators 130, as illustrated in FIGS. 17 and 18. Bolt assemblies 131 carried within the spacing insulators and extending downwardly from the top panel 101 are utilized to clamp the plates P and insulators 130, as well as insulating washers 132, together in a tight assembly, whereby each of the plates P is insulated from one another and from the bolt assemblies 131.

Associated with the tens keys TK' and the special split change keys SK', 25, 50 and 100, are plates respectively designated 5¢P, 10¢P, 10¢AP, 25¢P and 50¢P, while associated with the digit keys DK' and the special split change keys SK', 5 and 10, are plates respectively designated 1¢P, 2¢AP, 5¢AP and MSP. Common to all of the keys is a ground plate GP which extends as a lower most plate between both of the rows of keys. Spring contact clips 133 for maintaining electrical contact between the push rods 105 and the ground plate GP are secured to and depend from the underside of the ground plate GP. The upper most plate under each row of keys, namely the plates 50¢P and MS, also support insulated spring seats 38 which are adapted to retain the lower ends of springs 119 associated with each of the push buttons 100.

Each of the keys is guided when operated by the top panel 101 and the ground plate GP. Similarly, the "Lock Release" key which is utilized solely for the purpose of operating the depletion release switch DRS, is guided, when operated, by the top panel 101 and the ground plate GP.

Each of the push rods 105 of the tens keys TK', digit keys DK' and the split change keys SK' is fitted with one or more laterally projecting resilient but relatively stiff wire contacts 134 which are suitably positioned and are adapted to make electrical contact with one or more of the plates, MSP, 1¢P, 2¢P, 2¢AP, 5¢P, 5¢AP, 10¢AP, 10¢P, 25¢P and 50¢P, when a respective key is depressed. In addition certain of the split change keys SK' are provided with extended upwardly projected resilient wire contacts 137 (FIG. 19), which contacts 137 provide contact with the motor plate MSP when split change keys SK', 25, 50 and 100 are depressed.

In the drawings, FIGS. 18 and 19, the positions of the various wire contacts 134 are shown, it being noted that for purposes of clarity only one row of keys and the details thereof is shown in either instance. The following table designates the key and the respective plates contacted by it through the wire contacts 134 when the key is depressed:

|  | Plates Contacted |
|---|---|
| The DK' Key: | |
| 1 | MSP, 1¢P. |
| 2 | MSP, 2¢P. |
| 3 | MSP, 1¢P, 2¢AP. |
| 4 | MSP, 2¢P, 2¢AP. |
| 5 | MSP, 5¢AP. |
| 6 | MSP, 5¢AP, 1¢P. |
| 7 | MSP, 5¢AP, 2¢P. |
| 8 | MSP, 5¢AP, 2¢AP, 1¢P. |
| 9 | MSP, 5¢AP, 2¢AP, 2¢P. |
| 0 | MSP. |
| The TK' Key: | |
| 1 | 10¢P. |
| 2 | 10¢P, 10¢AP. |
| 3 | 25¢P, 5¢P. |
| 4 | 25¢P, 10¢P, 5¢P. |
| 5 | 50¢P. |
| 6 | 50¢P, 10¢P. |
| 7 | 50¢P, 10¢AP, 10¢P. |
| 8 | 50¢P, 25¢P, 5¢P. |
| 9 | 50¢P, 25¢P, 10¢P, 5¢P. |
| The SK' Key: | |
| 5 | MSP, 2¢AP, 2¢P, 1¢P. |
| 10 | MSP, 5¢AP, 2¢AP, 2¢P, 1¢P. |
| 25 | MSP, 10¢AP, 10¢P, 5¢P. |
| 50 | MSP, 25¢P, 10¢AP, 10¢P, 5¢P. |
| 100 | MSP, 50¢P, 25¢P, 10¢AP, 10¢P, 5¢P. |

Disposed beneath each of the push rods 105 operated by the tens keys TK', 3, 4, 8 and 9, which push rods are those arranged to make contact with plate 5¢P, is a normally closed snap-acting switch 135' having an actuating lever 136 operated by the extension 106 of the respective push rod 105 when the particular key is depressed. All of the four switches 135' are connected in series electrical connection and are diagrammatically represented in FIG. 21 as a single switch 135', the operation of any one of the switches 135' being effective to open the diagrammatically illustrated switch 135'. One side of switch 135' is connected to conductor 56A and the other side is connected to conductor 65.

Referring again to FIGS. 17 and 18, together with the diagrammatic circuit of FIG. 21 it may be seen that each of the push rods 105 is connected through the ground plate GP to the conductor 56A which corresponds to the conductor similarly designated in FIGS. 14 and 15. Each push rod 105 together with a wire contact 134 and a plate P arranged for electrical contact with the wire contact 134 constitutes an electrical switch, and in electrical and mechanical effect the switch means illustrated in FIGS. 16–21 replace the rocker operated switches discussed in the keyboard embodiment of FIGS. 1–11.

Whenever a push rod 105 carrying a contact 134 adapted to contact plate 1¢P is depressed, a switch circuit is closed from conductor 56A, through the push rod 105, contact 134, plate 1¢P to conductor 60, which conductor 60 corresponds to a similarly designated conductor in FIG. 14. Similarly, when a push rod 105 having a contact 134 adapted to contact plate 2¢P is depressed, a switch circuit is closed from conductor 56A, through the push rod 105, contact 134, plate 2¢P to conductor 61, conductor 61 again corresponding to that appearing in FIG. 14.

In like fashion, each of the various plates, 2¢AP, 5¢AP, 10¢P, 10¢AP, 25¢P, 50¢P, 5¢AP and MSP is connected to the conductor 56A, and through contacts 134 on push rods 105 switch circuits may be closed to the respective conductors 62, 67, 69, 74, 63, 64, 80, 81. The coin dispensing operation is accordingly completed through the dispensing circuit of FIGS. 14 and 15 in the manner previously described when any key or combination of keys is depressed.

When any one of the push rods 105 having a contact 134 associated with the plate 5¢P is depressed, the switch 135' is moved to open position to interrupt the circuit through conductor 65 as before.

The motor circuit shown in FIG. 15 is energized for each coin dispensing operation through the motor plate MSP, conductor 81 and the associated circuitry diagrammatically illustrated in FIG. 15. As in the rocker operated switch keyboard heretofore described, the motor circuit is energized either by the depression of any one of the digit keys DK' or the depression of the zero key when any one of the tens keys is depressed. The switching is accomplished through contacts 134 associated with the motor plate MSP disposed beneath the row of digit keys. Depression of each of the split change keys SK' is also adapted to energize the motor circuit, split change keys 5 and 10 having contacts 134 associated with the motor plate MSP, and split change keys 25, 50 and 100 having extended contacts 137 arranged to contact the motor plate MSP when any of such keys is depressed.

Reference is here made to the applications of Arnold R. Buchholz and William H. Sprenger, for Coin Dispensing Machine, Serial No. 477,154, filed December 23, 1954, and our application Serial No. 721,743, filed March 17, 1958, to claims for any common subject matter.

We desire it to be understood that this invention is not to be limited to any particular form or arrangement of parts except insofar as such limitations are included in the appended claims.

We claim:

1. In a coin payer having penny channels, a five cent channel, ten cent channels, a quarter channel and a half dollar channel; a plurality of electro-responsive devices for controlling the dispensing of coins from said channels; a control apparatus for said devices including a keyboard having tens keys 1 to 9, digit keys 1 to 9 and zero; a plurality of switches selectively controlled by said keys, said switches including a one penny switch, a pair of two penny switches, a pair of five cent switches comprising a single pole switch and a double pole switch, the actuation of the single pole five cent switch being controlled by the digit keys 5–9, inclusive, the double pole switch having a first and second operating position and arranged for normal serial connection, while in said first position, with the single pole switch upon actuation thereof and being movable to its second operating position under the control of the tens keys 3, 4, 8 and 9 respectively, first and second single pole ten cent switches, said first ten cent switch being controlled by the 1, 2, 4, 6, 7 and 9 tens keys and the second ten cent switch being controlled by the 2 and 7 tens keys, a quarter switch and a half dollar switch; a plurality of circuits selectively controlled by said switches for selectively rendering certain predetermined electro-responsive devices operable to dispense from said channels the least number of coins to make up the desired amount of money to be dispensed; a pair of relays each having a solenoid and contacts operable thereby which contacts are interposed in the respective circuits of the double pole five cent switch, the first ten cent switch and the quarter switch to provide alternative electrical connections to the electro-responsive device controlled thereby operable for dispensing said least number of coins, the energization of one of said relays being dependant upon the closure of said single pole five cent switch, and the energization of the other of said relays being dependant upon the closure of said second ten cent switch; and electrically operated means operable to dispense at least one coin from each of the channels whose electro-responsive devices have been rendered operative.

2. In a coin payer having penny channels, a five cent channel, ten cent channels, a quarter channel and a half dollar channel; a plurality of electro-responsive devices for controlling the dispensing of coins from said channels; control apparatus for said devices including a keyboard having tens keys 1 to 9, digit keys 1 to 9 and zero; a plurality of normally open switches selectively controlled by said keys, said switches including a one penny switch, a pair of two penny switches, a five cent switch, a pair of ten cent switches, a quarter switch and a half dollar switch; a double pole five cent switch having a first and a second operating position, the actuation of said switches being selectively controlled by said keys; a plurality of circuits selectively controlled by said normally open and double pole position switches for selectively rendering certain predetermined electro-responsive devices operable to dispense from said channels the least number of coins to make up the desired amount of money to be dispensed, the actuation of said normally open five cent switch being controlled by the digit keys 5–9, inclusive, and the actuation of the double pole five cent switch being controlled by the digit keys 3, 4, 8 and 9, respectively; a relay operated switch in one of said circuits, said normally open five cent switch being adapted to control the energization of said relay to render operative one of said electro-responsive devices which is associated with said double pole five cent switch when in its first operating position, and to render operative another of said electro-responsive devices which is associated with said double pole five cent switch when in its second operating position; and electrically operated means operable to dispense at least one coin from each of the channels whose electro-responsive devices have been rendered operative.

3. In a coin payer having penny channels, a five cent channel, ten cent channels, a quarter channel and a half dollar channel; a plurality of electro-responsive devices for controlling the dispensing of coins from said channels; control apparatus for said devices including a keyboard having tens keys 1 to 9, digit keys 1 to 9 and zero; a plurality of switches selectively controlled by said keys, said switches including a one penny switch, a pair of two penny switches, a pair of five cent switches comprising a normally open, single pole switch the actuation of which is controlled by the digit keys 5–9, inclusive, and a double pole switch the actuation of which is controlled by the digit keys 3, 4, 8 and 9, respectively, first and second normally open single pole ten cent switches, said first ten cent switch being controlled by the 1, 2, 4, 6, 7 and 9 tens keys and the second ten cent switch being controlled by the 2 and 7 tens keys, a quarter switch and a half dollar switch; a plurality of circuits selectively controlled by said switches for selectively rendering certain predetermined electro-responsive devices operable to dispense from said channels the least number of coins to make up the desired amount of money to be dispensed; a pair of relays each having a solenoid and contacts operable thereby which contacts are interposed in the respective circuits of the double pole five cent switch, the first ten cent switch and the quarter switch to provide alternative electrical connections to the electro-responsive device controlled thereby operable for dispensing said least number of coins, the energization of one of said relays being dependent upon the closure of said single pole five cent switch, and the energization of the other of said relays being dependant upon the closure of said second ten cent switch, certain of said circuits being effective to render operative the electro-responsive device associated with the quarter channel when both of said relays are energized; electrically operated means operable to dispense at least one coin from each of the channels whose electro-responsive devices have been rendered operative; and a control circuit for said electrically operated means including an energizing switch controlled by said digit keys 1 to 9 or said zero key whereby amounts of one to nine cents may be dispensed on the selected depression of the digit keys 1 to 9 and amounts of from ten to ninety-nine cents may be dispensed on the selected depression of said tens keys 1 to 9 and the selected depression of said digit keys 1 to 9 or said zero key.

4. In switching mechanism for controlling an electrically operated and controlled coin dispensing apparatus having penny channels, a five cent channel, ten cent channels, a quarter channel and a half dollar channel, the combination comprising: a row of tens keys 1 to 9, a row of digit keys 1 to 9 and zero, each of said keys being manually depressible and including a downwardly extending conductive member terminating in a laterally extending latching projection, a plurality of substantially horizontal conductive plates stacked in spaced relationship adjacent to said conductive members, biasing means normally urging the respective keys in an upward direction, selectively positioned contacts projecting laterally from each conductive member and adapted to contact certain of said plates when a respective key is depressed, and electrical circuit connections joining each of said plates and said conductive members to said dispensing apparatus, and means for maintaining the electrical circuit to the dispensing apparatus upon manual release of the respectively depressed keys, until a coin dispensing cycle has been completed by said dispensing apparatus, said means comprising a latching member normally urged towards latching engagement with said key latching projection and engageable therewith upon depression of a manually selected key or keys, latch release means engageable with said latching member, electro-responsive means for controlling the operation of said latch release means responsive and operable upon interruption of the current to said circuit connections to actuate said latch release means for disengaging said latching member from the said key projections and to permit the key or keys to be urged upwardly under the influence of said biasing means.

5. Apparatus according to claim 4 in which a normally closed electrical switch is disposed in a selected position to be operated when a selected tens key 3, 4, 8 and 9 is depressed.

6. In a switching mechanism for controlling an electrically operated and controlled coin dispensing apparatus having penny channels, a five cent channel, ten cent channels, a quarter channel and a half dollar channel, the combination comprising: a row of ten keys 1 to 9, a row of digit keys 1 to 9 and zero, each of said keys being manually depressible and including a downwardly extending conductive member terminating in a laterally extending latching projection, a plurality of substantially horizontal conductive plates stacked in spaced relationship under each of said rows of keys and having aligned apertures therein, said conductive members being positioned in the aligned apertures in said plates; selectively positioned contacts projecting laterally from each conductive member and adapted to contact certain of said plates when a respective key is depressed; electrical circuit connections joining each of said plates and said conductive members to said dispensing apparatus, and means for maintaining the electrical circuit to the dispensing apparatus upon manual release of the respectively depressed keys, until a coin dispensing cycle has been completed by said dispensing apparatus, said means comprising a latching member normally urged towards latching engagement with said key latching projection and engageable therewith upon depression of a manually selected key or keys, latch release means engageable with said latching member, electro-responsive means for controlling the operation of said latch release means responsive and operable upon interruption of the current to said circuit connections to actuate said latch release means for disengaging said latching member from the said key projections and to permit the key or keys to be urged upwardly under the influence of said biasing means.

7. Apparatus according to claim 6 in which the downwardly extending conductive member is guided by and is in electrical contact with one of said conductive plates.

References Cited in the file of this patent

UNITED STATES PATENTS

| | | |
|---|---|---|
| 1,356,379 | McDermott | Oct. 19, 1920 |
| 2,893,406 | Buchholz | July 7, 1959 |
| 2,922,427 | Buchholz | Jan. 26, 1960 |